(12) United States Patent
Hughes et al.

(10) Patent No.: US 12,379,352 B2
(45) Date of Patent: Aug. 5, 2025

(54) ULTRASONIC DEVICE

(71) Applicant: Novosound Ltd, Newhouse (GB)

(72) Inventors: David Hughes, Newhouse (GB);
Daniel Irving, Newhouse (GB);
Heather Trodden, Newhouse (GB)

(73) Assignee: NOVOSOUND LTD, Newhouse (GB)

( * ) Notice: Subject to any disclaimer, the term of this patent is extended or adjusted under 35 U.S.C. 154(b) by 545 days.

(21) Appl. No.: 17/441,965

(22) PCT Filed: Feb. 27, 2020

(86) PCT No.: PCT/GB2020/050468
§ 371 (c)(1),
(2) Date: Sep. 22, 2021

(87) PCT Pub. No.: WO2020/193941
PCT Pub. Date: Oct. 1, 2020

(65) Prior Publication Data
US 2022/0163486 A1    May 26, 2022

(30) Foreign Application Priority Data
Mar. 22, 2019 (GB) .................... 1903986

(51) Int. Cl.
*G01N 29/22* (2006.01)
*G01N 29/24* (2006.01)
*G01N 29/32* (2006.01)

(52) U.S. Cl.
CPC ......... *G01N 29/223* (2013.01); *G01N 29/228* (2013.01); *G01N 29/2437* (2013.01);
(Continued)

(58) Field of Classification Search
CPC .. G01N 29/225; G01N 29/041; G01N 29/228; G01N 29/2437; G01N 2291/106;
(Continued)

(56) References Cited

U.S. PATENT DOCUMENTS

| 4,333,352 A | 6/1982 | Connery et al. |
| 5,869,767 A | 2/1999 | Hayward et al. |

(Continued)

FOREIGN PATENT DOCUMENTS

| EP | 1312423 A1 | 5/2003 |
| GB | 2555835 A | 5/2018 |

(Continued)

OTHER PUBLICATIONS

UKIPO; Office Action for GB Application No. 1903986.6 dated Jul. 9, 2019, 10 Pages.
(Continued)

*Primary Examiner* — Judy Nguyen
*Assistant Examiner* — James Split
(74) *Attorney, Agent, or Firm* — Christopher J. Knors; Moore & Van Allen PLLC

(57) ABSTRACT

An ultrasonic device, the device comprising at least one flexible ultrasonic transducer; and a clamp configured to mount the at least one transducer to a test object. Optionally, the clamp may comprise one or more bands and wherein the one or more bands can optionally be metal or at least part of the one or more bands may be formed of a conformable material such that the one or more bands comprises a conformable band or band portion.

14 Claims, 7 Drawing Sheets

(52) U.S. Cl.
CPC ..... *G01N 29/326* (2013.01); *G01N 2291/106* (2013.01); *G01N 2291/2634* (2013.01)

(58) Field of Classification Search
CPC ........... G01N 2291/2634; G01N 29/28; G01N 29/326; G01N 29/223; G01N 29/04; G01N 29/22; G10K 11/004; G10K 11/18
See application file for complete search history.

(56) References Cited

U.S. PATENT DOCUMENTS

| | | | | |
|---|---|---|---|---|
| 7,395,720 | B2* | 7/2008 | Wiest | G01N 29/223 |
| | | | | 73/761 |
| 7,399,284 | B2 | 7/2008 | Miwa et al. | |
| 8,186,643 | B2* | 5/2012 | Luo | F16L 41/008 |
| | | | | 248/230.8 |
| 8,550,842 | B1* | 10/2013 | Gutierrez | H01R 13/5216 |
| | | | | 439/604 |
| 9,335,298 | B2* | 5/2016 | O'Keefe | G01N 29/2437 |
| 9,586,234 | B2* | 3/2017 | Bar-Cohen | B06B 1/0215 |
| 9,618,481 | B2* | 4/2017 | Kruger | G01N 29/24 |
| 10,782,161 | B2* | 9/2020 | Silverman | G01N 29/223 |
| 11,168,601 | B2* | 11/2021 | Bean | F01N 13/18 |
| 11,268,936 | B2* | 3/2022 | Barshinger | G01N 29/0645 |
| 2010/0236330 | A1 | 9/2010 | Nyholt et al. | |
| 2014/0144238 | A1 | 5/2014 | Luo | |
| 2018/0150058 | A1* | 5/2018 | Shapiro | G05B 19/4097 |

FOREIGN PATENT DOCUMENTS

| | | |
|---|---|---|
| GB | 2571361 A | 8/2019 |
| GB | 2571529 A | 9/2019 |
| JP | 2014115128 A | 6/2014 |
| JP | 3212734 U * | 9/2017 |
| WO | 2013063676 A1 | 5/2013 |
| WO | 2018/087560 A1 | 5/2018 |
| WO | 2018172769 A1 | 9/2018 |
| WO | 2019/166805 A2 | 9/2019 |
| WO | 2019/166815 A1 | 9/2019 |

OTHER PUBLICATIONS

Hou, Ruozhou, et al.; "Use of sputtered zinc oxide film on aluminum foil substrate to produce a flexible and low profile ultrasonic transducer", Ultrasonics, 2016, pp. 54-60, vol. 68.
European Patent Office; International Search Report and Written Opinion for International Application No. PCT/GB2020/050468 dated May 12, 2020, 13 Pages.
The International Bureau of WIPO; International Preliminary Report on Patentability dated Oct. 7, 2021, 9 Pages.

* cited by examiner

Units: mm

ULTRASONIC DEVICE

CROSS-REFERENCE TO RELATED APPLICATIONS

This application is a 35 U.S.C. § 371 National Stage Application of International Application No. PCT/GB2020/050468, filed Feb. 27, 2020, which claims the benefit of GB Application No. 1903986.6 filed on Mar. 22, 2019, the entirety of each of which is incorporated herein by reference.

FIELD

The present disclosure relates to ultrasonic and other piezoelectric devices.

BACKGROUND

Ultrasound spans the range of sound frequencies that are higher than the range that can be heard by humans, and generally have frequencies of greater than 20 kHz. Typical ranges of operation extend from 100 kHz up to several Gigahertz. Due to the much higher frequencies involved, ultrasonic devices are typically very different from those generally used for audible applications.

Analysis using ultrasound waves shows great promise in a range of applications, particularly in imaging such as medical imaging but also in fields such as non-destructive testing (NDT), particularly in industrial NDT, and measurement, such as in measurement of pipe wall thicknesses, corrosion and erosion monitoring and other challenges in asset integrity management. However, ultrasound has a wide range of uses and the applications of ultrasound are not limited to these examples.

The ultrasound transducer is operable to produce ultrasonic waves that are transmitted into an object and detect reflections of the ultrasonic waves that are reflected from the interfaces between the layers of the sample or defects and objects inside the sample). By using techniques such as time of flight and other analyses, it is possible to image the layers of the sample and thereby characterise the sample.

Conventional ultrasonic transducers are generally formed from bulk ceramic materials, which can be high cost, bulky and difficult to manufacture, particularly with the shapes and properties desired for many applications. Traditional ceramic materials used in ultrasound are generally not suitable for very high temperature operation, making them unsuitable for some applications. In particular, the combination of being able to operate at high temperature and with sufficient resolution is problematic for many traditional ultrasound transducers. The ability to record an ultrasound measurement at high temperature is further limited by the requirement for a couplant material between the sensor and the object. Furthermore, traditional ultrasound transducers are not easy to manufacture using automated techniques and often require a high degree of manual operation. Improved ultrasonic transducers and methods for manufacturing them are therefore desirable.

SUMMARY

Various aspects of the present invention are defined in the independent claims. Some preferred features are defined in the dependent claims.

According to a first aspect of the present disclosure is a piezoelectric and/or ultrasonic device, the device comprising:

at least one transducer; and
a clamp configured to mount the at least one transducer to a test object.

The at least one transducer may be a piezoelectric transducer. The at least one transducer may be an ultrasonic transducer. The at least one transducer may be a flexible transducer. The at least one transducer may be a thin film transducer.

The test object may be or comprise a pipeline, conduit or other cylindrical member.

The device may be a high temperature device, configured to operate at high temperatures. For example, the device may be configured to operate above 30° C., e.g. above 50° C. such as above 100° C. The device may be configured to operate at temperatures between 30° C. and 500° C., e.g. between 100° C. and 500° C. The device may be configured to operate at temperatures below 30° C., e.g. below 30° C. such as below −10° C., e.g. down to −100° C.

The device may be configured to measure temperature, or a property representative thereof, e.g. configured to measure temperature of the device and/or a region directly adjacent the device. The device may be, comprise or be comprised in a combined ultrasonic and temperature measurement device. The device may comprise one or more temperature sensors, which may be in addition to the piezoelectric transducers or one or more of the piezoelectric transducers may have a dual temperature measurement and ultrasonic generation and/or reception capability such that they are operable as both a temperature sensor and an ultrasonic transducer. The transducers may have both piezoelectric and pyroelectric properties.

The clamp may comprise one or more bands. Although the clamp beneficially may comprise bands, it will be appreciated that other clamping mechanisms could be used, such as gripping members, e.g. adjustable or resiliently deformable gripping members or the like. The choice of clamp may depend on the application and the amount of securing force that is required.

At least part or all of the one or more bands may be conformable and/or flexible. The one or more bands may be formed of or comprise conformable material, e.g. the one or more bands may comprise a conformable and/or flexible band or band portion.

The conformable band or band portion may be a band or portion of the band that is configured to face or abut the test object, in use. The conformable material may be an elastomeric material, such as a high temperature engineering polymer, which may be stable at temperatures of 150° C., 250° C., 300° C. or higher. The conformable material may optionally be or comprise fluoroelastomer, perfluoroelastomer, silicone blends, graphite based blends and/or the like.

By providing the conformable band or band portion the device may operate without a couplant, which may be particularly suited for high temperature and/or long term applications.

The at least one transducer or transducer array may be at least partially or fully embedded or moulded into the conformable band or band portion. The at least one transducer or transducer array may be inserted, or selectively insertable or removable into the conformable band or band portion, e.g. the at least one transducer or transducer array may be provided as an insert into the conformable band or band portion.

At least one or each of the bands may be or comprise a metal band. At least one or each of the bands may be or comprise a rigid or semi-rigid band.

The conformable band or band portion may be affixed to the metal or rigid or semi-rigid band. The conformable band or band portion may at least partially or totally enclose the metal band. The conformable band or band portion may mount the piezoelectric transducer or transducer array to the metal band.

The at least one transducer may have wiring that may be moulded through the conformable material and/or channeled between the conformable material and the metal band. The at least one transducer or transducer array may comprise a connector, such as a surface mount connector e.g. a microcoax connector, for connecting the transducer to an input signal source for receiving the drive signal for driving the transducers and/or to an output system for providing the output signal from the transducers to the output system. This arrangement may allow the transducers or transducer array to be connected with a separate wire, which may allow extra modularity.

The at least one band may be configured with a securer for locking the band to, and/or selectively releasing the band from, the test object and/or for adjusting the tension in the band. The securer may be or comprise a ratchet mechanism, screw/bolt closure, worm gear arrangement or the like. The securer may be configured to adjust the circumference of the at least one band, e.g. to tighten and/or loosed the at least one band on the test object, in use. The securer may be or may be comprised in a selective closure mechanism, for allowing the band to be selectively placed on and/or removed from the test object.

The use of the metal band in addition to the conformable band may provide the required structural strength to secure fix the device to the test object.

The clamp may or may not comprise the conformable band or band portion or conformable material, e.g. the clamp may comprise just the metal band, just the conformable band formed of the conformable material or a band having both a metal band and the conformable band portion formed from the conformable material. However, in those embodiments that do comprise the conformable material, then the conformable material may extend between the at least one piezoelectric transducer and the at least one metal band. The conformable material may be electrically insulating, e.g. the conformable material may electrically insulate the at least one piezoelectric transducer from the metal band. The conformable material may provide some protection for the at least one transducer. The conformable material may beneficially distribute force on the at least one transducer. The conformable material may also provide a degree of compensation for movement or expansion and contraction of the test object, which may be particularly applicable when the test object is a pipe or conduit designed to carry fluids of varying temperatures.

The device may comprise an urging mechanism, which may be configured to urge the transducer or transducer array towards, onto and/or into contact with the test object, in use. The urging mechanism may be configured to move, and/or apply a force on, the at least one transducer or transducer array, e.g. to axially move or apply a force on the at least one transducer or transducer array. The urging mechanism may be configured such that the position, e.g. axial position, and/or the force applied by the urging mechanism on the at least one transducer or transducer array is selectively variable or adjustable, e.g. by operation of the urging mechanism. The urging mechanism may be manually adjusted or automatically adjusted.

This arrangement may allow the force or interface between the at least one transducer or transducer array to be adjusted, e.g. for optimal acoustic transfer. This may be particularly beneficial with conformable devices comprising flexible transducers or transducer arrays and conformable material or buffers, particularly devices that are configured to operate without couplant, as the urging mechanism may provide a beneficial interface between the at least one transducer or the transducer array and the test object that would otherwise have been provided by the couplant.

The urging mechanism may comprise a screw or other rotational assembly. The screw or other rotational assembly may be operable into a configuration in which it acts on the at least one transducer or transducer array, e.g. to urge the transducer or transducer array towards and/or into contact with the test object, in use. The device may comprise a device body. The at least one transducer or transducer array and/or the urging mechanism may be housed in or mounted on the device body.

The urging mechanism, e.g. the screw, may be coupled to the at least one transducer or transducer array via a coupling. The coupling may accommodate the rotational motion of the screw or other rotational mechanism without transferring rotational motion to the at least one transducer or transducer array. The coupling may be or comprise a socket joint. This may prevent damage to the transducer or transducer array from grinding against the test object whilst still allowing travel in the axial direction to allow the transducer or transducer array to compress against a surface of the test object. The urging mechanism, e.g. the screw and/or the coupling may be formed of or comprise a rigid material, such as a metal, e.g. stainless steel.

A conformable buffer may be provided between the coupling and/or urging mechanism and the at least one transducer or transducer array. The conformable buffer may accommodate the flexible transducer or transducer array conforming to the shape of the test object whilst still applying a force from the urging mechanism to the transducer or transducer array, e.g. to urge the transducer or transducer array towards or onto the test object. The conformable buffer may more evenly distribute the urging force and may help avoid damage to the transducer or transducer array. The conformable buffer may also help accommodate expansion and/or contraction and/or other movement of at least part of the test object, and may help maintain good acoustic coupling. The conformable buffer may be configured to withstand high temperatures, e.g. 150° C., 250° C., 300° C. or higher. The buffer may be non-polymeric. The buffer may comprise graphite, fibre reinforced materials, minerals such as soft minerals, e.g. vermiculite, steatite, phyllosilicates, pyrophyllite, mica and/or calcium silicate, and the like.

Although an example of an urging mechanism in the form of a screw mechanism is detailed above, the urging mechanism is not limited to this. For example, the at least one conformable band or band portion or conformable material or other resiliently deformable material may be provided and be configured to perform the actions of the urging mechanism, e.g. to urge the transducer or transducer array towards and/or into contact with the test object, in use. In this case transverse extension, lengthening, tensioning or application of a force on the conformable band or band portion or conformable member or other resiliently deformable material may cause it to apply an axial force on the transducer or transducer array, which may urge the transducer or transducer array towards and/or into contact with the test object, in use. The tensioning may be carried out using the securer. Other examples of urging mechanisms include, piston/syringe/friction fit arrangements, quick release/asymmetric bolt and lever type mechanisms, and/or the like.

The transducers may be configured to produce and emit ultrasonic waves, e.g. responsive to a drive signal, and/or receive and detect ultrasonic waves, e.g. to receive and detect reflections of the emitted ultrasonic waves. The device may be an ultrasonic device for imaging, measurement or testing, e.g. non-destructive testing. The device may be a medical ultrasound imager. The device may be a non-destructive testing device. The transducers may be configured to provide an output signal representative of the received ultrasonic waves or one or more properties thereof, e.g. of the amplitude, frequency, wavelength, and/or timing of the ultrasonic waves. The transducers may be configured to emit ultrasonic wave and/or to detect and/or measure received reflections of the ultrasonic waves.

Having temperature sensor capability integrated into the device, may allow greater accuracy for measurements that are affected by temperature effects, such as wall thickness that is calculated from the time of flight measurement. For example, the temperature measurements at the sensor face may be used to compensate for changes in speed of sound with temperature rather than by using a computer model of heat transfer through a delay line or couplant.

The device may comprise a transducer array and the at least one transducer may be comprised in the transducer array. The transducer array may be a flexible transducer array. The at least one transducer and/or the transducer array may comprise a layer of piezoelectric material provided on a substrate, e.g. directly on the surface of a substrate. Each transducer of the transducer array may comprise one or more discrete electrodes provided directly on the layer material. The at least one transducer and/or the transducer array may comprise a layer of dielectric material, such as photoresist e.g. SU-8, deposited on the piezoelectric layer and/or between the discrete electrodes. The substrate may be, comprise or be comprised in a counter electrode. The substrate may be an electrically conductive substrate. The at least one transducer and/or the transducer array may comprise one or more electrical contacts coupled to one or more of the electrodes, e.g. to respective electrodes, by electrically conductive traces. The one or more electrical contacts and/or the electrically conductive traces may be provided on the substrate, on the piezoelectric layer and/or on the dielectric material. Individual electrodes and/or transducers may be individually addressable using respective conductive traces. The device may comprise one of more features of the ultrasound transducers disclosed in GB1803444.7, GB 1803257.3, GB2555835, WO2018/087560, PCT/GB2019/050567 and/or PCT/GB2019/050549, all in the name of the present applicants and the contents of each of which are incorporated by reference as if disclosed in full herein.

The substrate may be a flexible and/or conformable substrate, such as a foil, which may be a metal foil, e.g. an aluminium foil. The piezoelectric material may be or comprise a metal or transition metal compound, such as a metal oxide or nitride, which may be a primary piezoelectric material. The piezoelectric material may be or comprise a zinc or aluminium compound, such as aluminium nitride (AlN) or zinc oxide (ZnO). The piezoelectric material may optionally be doped, e.g. with a transition metal or transition metal compound, such as Vanadium or Scandium. The piezoelectric material may be a crystalline, e.g. polycrystalline or columnar piezoelectric material. The piezoelectric material may be non-polymeric or may not be comprised in a polymeric material. The piezoelectric material may be or comprise a continuous layer of material having piezoelectric properties, e.g. the piezoelectric material may not comprise discrete domains of piezoelectric material having piezoelectric properties within a matrix of non-piezoelectric material. The layer of piezoelectric material may have a thickness in the range of 2 to 20 µm. The layer of piezoelectric material may be thinner than the substrate.

The piezoelectric material may be doped with a dopant or further material, e.g. with a transition metal or a compound thereof, e.g. with vanadium. The dopant or further material may be present in the piezoelectric material at a level up to 10% with respect to weight, e.g. from 0.01 to 10% w/w. The primary piezoelectric material, e.g. the metal oxide or metal nitride, may be present in the layer of piezoelectric material in levels from 90% w/w up to 99.99% w/w. The dopant or other material may be integrated, co-deposited or reacted into the primary piezoelectric material, e.g. alloyed with or doped into the primary piezoelectric material, and may not be mixed with or coated onto or in discrete domains with the primary piezoelectric material.

The device body may be formed from metal, polymeric material, and/or the like. For example, the device body may be formed of stainless steel. The device body may be rigid. The device body may be hollow, e.g. to accommodate therein the at least one transducer or transducer array and/or the urging mechanism and/or any wiring, connectors and/or electronics for operating the at least one transducer or transducer array. The clamp, e.g. the one or more bands, may pass through the device body, e.g. so that the device body can be securely fixed to the test object using the clamp.

However, it will be appreciated that the device body need not be rigid. For example, at least part of the at least one transducer or transducer array (and optionally at least one of the other components identified above or below as being housed in the device body) may be embedded or otherwise provided in the conformable material, such that the conformable material effectively acts as the device body.

For example, multiple devices may be provided as a sheet, wherein the sheet may be formed predominantly of the deformable material. The at least one transducer or transducer array may be embedded in the sheet or may be insertable into the sheet. The sheet may be cut to length, e.g. with a variable number of transducers, to suit a given application. The sheet may be provided on and/or feedable from a reel or spool. The sheet may comprise or be configured to receive a plurality of the transducers with different intra-transducer spacings between transducers, which may further allow devices with various configurations to be obtained.

The device may comprise a power source, such as a battery, capacitor, inductive power coupling system or other electrochemical, electrostatic or electromagnetic power source. The device may be wired or wireless. The device may receive power and/or the drive signal and/or may output the output signal via wired or other physical connectors. Alternatively or additionally, the device may receive the drive signal and/or provide the output signal wirelessly. The device may comprise a wireless communications system for communicating wirelessly with remote and/or separate devices, e.g. to receive the drive signal and/or to send the output signal. The wireless communications system may be configured to communicate using Bluetooth®, ZigBee®, WiFi®, WiMAX®, NFC, a cellular telephone and/or data network or other suitable communications channel or mechanism. Optionally the power for the device may be provided wirelessly, e.g. via inductive coupling. The drive signal may be provided by control electronics, which may be onboard the device, e.g. housed in the device body, and may be provided using the power source. The device may comprise or be configured to access data storage and the device may be configured to record the output signal, e.g. over time, in the data storage. The data storage may be on-board, e.g. within the device body and may be powered by the power source. The data storage may be external and/or remote from the device, e.g. such that the data is output from the device to the data storage, e.g. via wired or wireless communications.

The above arrangements may provide various advantages. For example, the device may be easier and/or quicker to install. The device may be securely clamped to a test object, e.g. pipe. The device may achieve and maintain good acoustic coupling between the at least one transducer or transducer array and the test object and may do so without the use of a couplant, such as a gel. The device may be easier to conform around the shape of a test object. The device may have a very low profile, which may be beneficial in certain applications such as deployment in confined spaces, around corners, close to joints, in complex and close networks of pipes and particularly in oil and gas pipelines with minimal disruption to the design of the pipelines.

According to a second aspect of the present disclosure is a method of manufacturing, repairing or assembling the device of the first aspect. The method may comprise providing at least one transducer and a clamp. The transducer may be a piezoelectric transducer. The transducer may be an ultrasonic transducer. The at least one transducer may be a flexible transducer. The method may comprise providing at least part of the at least one transducer on or in a device body. The method may comprise mounting the device body on the clamp or the clamp may be integral with the device body.

The method may comprise providing and mounting one or more temperature sensors. The one or more temperature sensors may be in addition to the one or more transducers or one or more of the transducers may have a dual temperature measurement and ultrasonic generation and/or reception capability such that they are operable as both a temperature sensor and an ultrasonic transducer. The clamp may comprise one or more bands, which may comprise one or more metal bands and/or conformable bands and/or conformable band portions. The method may comprise providing a securer for locking the band to, and/or selectively releasing the band from, the test object. The method may comprise providing an urging mechanism, which may be configured to urge the transducer or transducer array towards and/or into contact with the test object, in use. The urging mechanism may comprise a screw mechanism. The method may comprise providing a coupling between the urging mechanism, e.g. the screw, and the at least one transducer or transducer array. The method may comprise providing a conformable buffer between the coupling or urging mechanism and the at least one transducer or transducer array.

The method may comprise providing and mounting a power source, such as a battery, capacitor, induction power coupling system or other electrochemical, electrostatic or electromagnetic power source, which may be provided in the device body. The method may comprise providing and mounting a wireless communications system for communicating wirelessly with remote and/or separate devices. The method may comprise providing and mounting control electronics, which may be housed in the device body. The method may comprise providing and mounting data storage.

According to a third aspect of the present disclosure is a method of using the device of the first aspect. The method may comprise or be comprised in a method of obtaining non-destructive testing (NDT) data. The method may comprise or be comprised in a method of obtaining imaging data such as ultrasound imaging data, e.g. medical imaging. The method may comprise or be comprised in a method of obtaining measurement data, such as measurement of wall thickness.

The method may comprise mounting the device to a test object using the clamp. The method may comprise placing the conformable band or band portion at least part or all of the way around the test object. The method may comprise providing the metal band at least part or all of the way around a test object. The method may comprise securing the clamp with the securer. The method may comprise operating the urging mechanism to bring the at least one transducer or transducer array into contact with, and/or to urge the transducer or transducer array onto a surface of, the test object. The method may comprise providing the test signal to the transducer array and/or receiving the output signal from the ultrasonic transducer array.

According to a fourth aspect of the present disclosure is computer readable code configured such that, when processed by an automated manufacturing system controller, causes the automated manufacturing system to produce at least part of the device of the first aspect and/or to perform the method of the second aspect.

The automated manufacturing system may comprise a 3D printer, additive manufacturing equipment, a robotic assembly system, a pick and placer, a computer numerical control (CNC) machine, and/or the like.

The individual features and/or combinations of features defined above in accordance with any aspect of the present invention or below in relation to any specific embodiment of the invention may be utilised, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

These and other aspects of the present disclosure will now be described, by way of example only, with reference to the accompanying Figures, in which.

DETAILED DESCRIPTION OF THE DRAWINGS

FIGS. 1 to 8 show an example of an ultrasonic device 5 for emitting ultrasonic waves and receiving and measuring the reflected ultrasonic waves in order to produce a signal representative of one or more parameters of the received ultrasonic waves. The specific examples shown in FIGS. 2 to 8 illustrate the use of the ultrasonic device in order to beneficially perform non-destructive testing, NDT, (e.g. wall thickness measurements) of a test object, which in this particular example is a pipe, such as an oil or other fluid or gas pipeline. However, the ultrasonic device 5 is not limited to this application and it will be appreciated that it could be used in other applications such as imaging, e.g. medical imaging, amongst others.

The device 5 comprises a device body 15, a clamp 20 and one or more ultrasonic transducers (in this example a plurality of the ultrasonic transducers are provided in an ultrasonic transducer array 25, which can be seen particularly in FIGS. 6, 7, 9 and 10).

Figure 9:
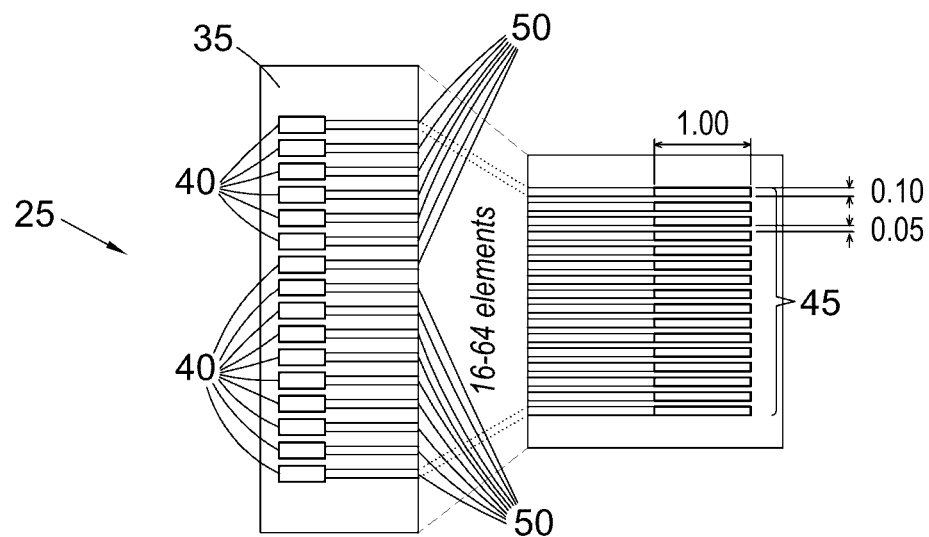
FIG. 9 is a plan view of a flexible ultrasonic transducer array that could be used in the ultrasonic device of FIG. 1.
Figure 10:
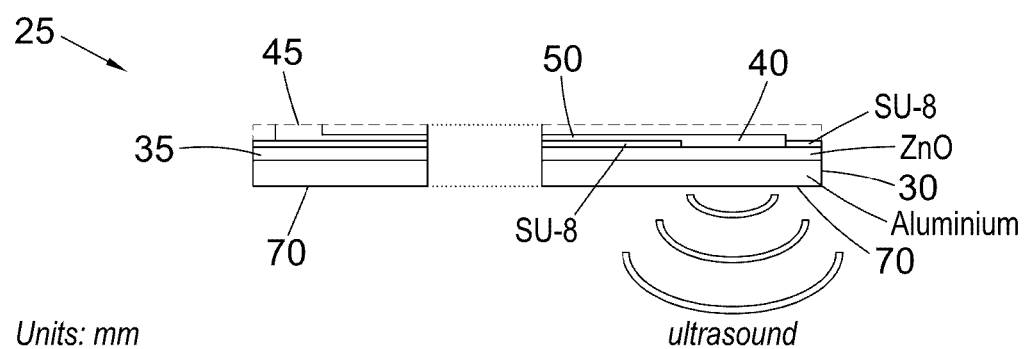
FIG. 10 is a cross sectional side view of the ultrasonic transducer array of FIG. 9.
Figure 11:
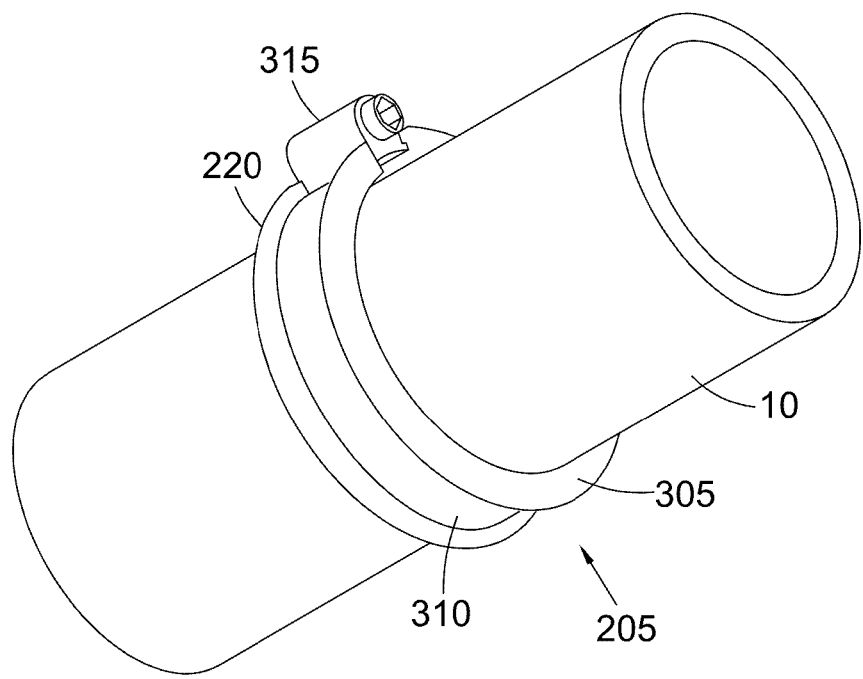
FIG. 11 is a perspective view of another ultrasonic device, in use, mounted on a test object in the form of a pipe.
Figure 12:
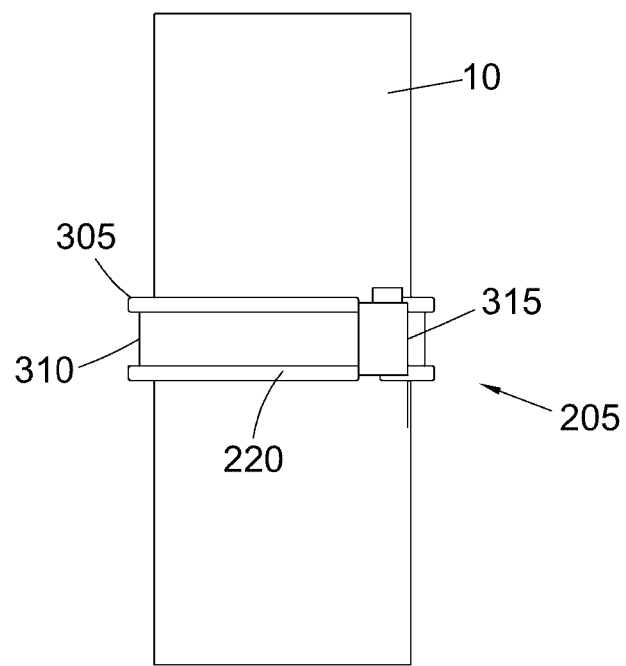
FIG. 12 is a side elevation view of the ultrasonic device of FIG. 11, in use, mounted on a test object in the form of a pipe.

As shown in FIGS. 9 and 10, in an example, the ultrasonic transducer array 25 is a flexible ultrasonic transducer array comprising a flexible, electrically conductive substrate 30, in this example in the form of a metal foil, with a piezoelectric layer 35 on a surface of the substrate 30. In this example, the piezoelectric layer 35 is in the form of a layer of non-polymeric, inorganic piezoelectric material, such as zinc oxide (ZnO) or aluminium nitride (AlN), optionally doped with a transition metal or transition metal compound such as vanadium. The piezoelectric layer 35 can be deposited directly onto the substrate by methods such as sputter coating and the like. In this example, the substrate 30 acts as a counter electrode and is arranged towards the test object 10 in use.

An array of electrodes 40 is provided on a surface of the piezoelectric layer 35 that is on an opposite side of the piezoelectric layer 35 to the substrate 30, such that the piezoelectric layer 35 is between the electrodes 40 and the substrate 30. Each electrode 40 is electrically connected to a corresponding electrical contact 45 by a respective conductive track 50. Each electrode and the associated portion of the piezoelectric layer 35 and substrate 30 can be considered to form a transducer of the transducer array 25. Each electrode 40 is individually addressable to drive the electrode 40 and to read out signals collected by the electrode 40. Electrically resistive dielectric material, such as photoresist e.g. SU-8, can optionally be provided between the piezoelectric layer 35 and both the conductive tracks 50 and contacts 45 and also between discrete electrodes 40, contacts 45 and conductive tracks 50 to mitigate against cross-talk.

For example, a control device (not shown) can be connected to the electrical contacts 45 to provide alternating drive signals to the electrodes 40 via the respective conductive tracks 50 in order to create a potential difference across the corresponding portions of the piezoelectric layer 35 that correspond to the driven electrode 40, so as to cause the corresponding portion of the piezoelectric layer 35 to oscillate with a frequency corresponding to that of the drive signal to thereby produce an ultrasonic wave having a corresponding frequency. Reflections of the emitted ultrasonic waves can also be received by the ultrasonic transducer array 25, causing at least portions of the piezoelectric layer 35 to oscillate, which thereby generates an electrical signal having a frequency dependent on that of the received ultrasonic wave. This can be received by the control device via the electrodes 40, conductive tracks 50 and contacts 45.

Examples of flexible ultrasonic transducers and ultrasonic transducer arrays that could be used (or at least features thereof) in the present examples are described in GB1803444.7, GB 1803257.3, GB2555835, WO2018/087560, PCT/GB2019/050567 and/or PCT/GB2019/050549, all in the name of the present applicant, and the contents of each of which are incorporated by reference as if disclosed in full herein.

The device body 15 in this example comprises a hollow metal enclosure that houses the ultrasonic transducer array 25 and any associated wiring and electronics. The device body 15 comprises an electrical connector 55 for connecting the contacts 45 of the ultrasonic transducer array 25 to the control device. The electrical connector 55 could be a microcoax connector, for example, but is not limited to this. The device body 15 comprises a plurality of feet 60, designed to engage with the test object 10 in order to securely mount the device 5 onto the test object 10.

The device body 15 is mounted onto the clamp 10, e.g. by passing part of the clamp 20 through channels in the device body, by physical connection, and/or the like. In this example, the clamp 20 comprises a plurality of bands 65. In this case the bands 65 are metal bands for strength and security, but are not limited to this. The bands 65 are configured to extend around at least part of the test object, in use, and to be selectively opened and closed. For example, the bands 65 may be configured to pass through channels in the device body 15 and to be secured by a screw, ratchet or other one-way mechanism, a lock lever, interference or press fit, a clip and/or the like.

Figure 6:
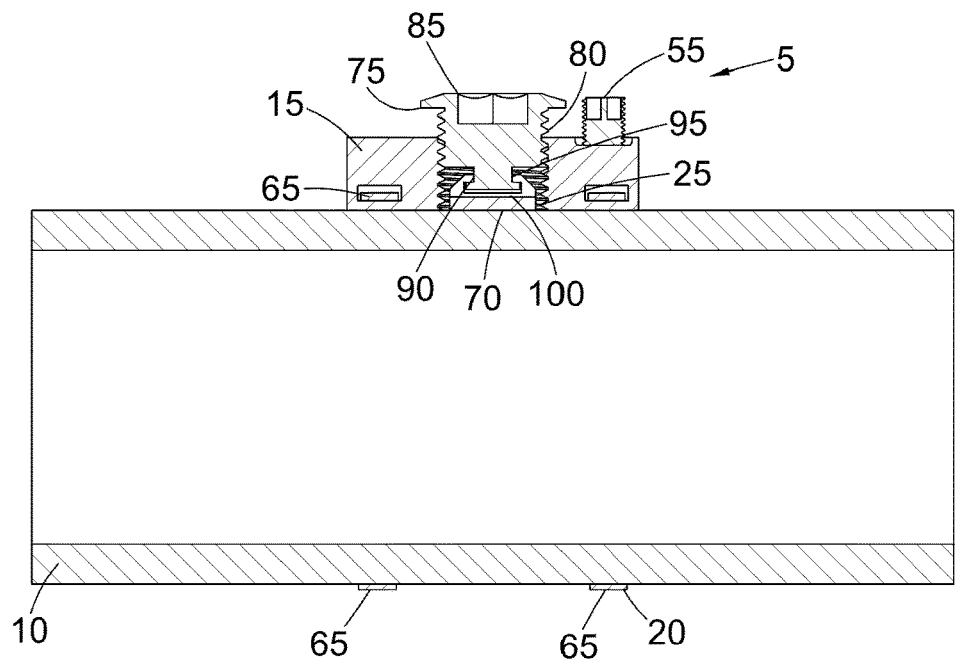
FIG. 6 is a cross sectional view through the section A-A indicated on FIG. 5 through the ultrasonic device of FIG. 1, in use, mounted on a test object in the form of a pipe.
Figure 7:
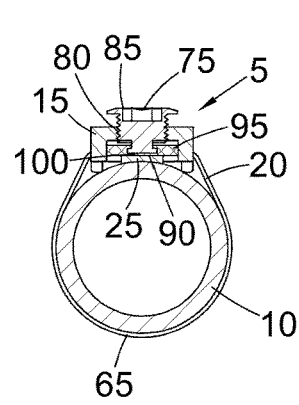
FIG. 7 is a cross sectional view through the section B-B indicated on FIG. 8 through the ultrasonic device of FIG. 1, in use, mounted on a test object in the form of a pipe.
Figure 8:
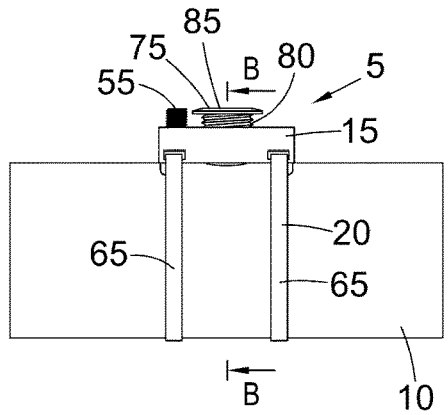
FIG. 8 is a side elevation view of the ultrasonic device of FIG. 1, in use, mounted on a test object in the form of a pipe.

As can be seen particularly in FIGS. 6 and 7, the flexible ultrasonic transducer array 25 is provided in the device body 15 and arranged such that an active (e.g. emitting/receiving) surface 70 or a coating such as a dielectric coating or membrane provided thereon is provided at an inner surface of the ultrasonic device 5 that is configured to abut and interface with the test object 10 in use. In the above example, the active surface is a surface of the substrate 30 that is opposite the surface of the substrate upon which the layer of piezoelectric material 35 is provided. The device comprises an urging mechanism 75 for urging the active surface of the ultrasonic transducer array 25 onto the outer surface of the test object 10.

In the example of FIGS. 1 to 8, the urging mechanism 75 comprises a screw 80 threaded into a complementary threaded channel in the top of the device body 15 so as to be screwable into the device body towards the test object 10 and out from the device body 15 away from the test object 10, in use. A proximal end 85 of the screw 80 is provided with a turning aid, such as a finger grip, and/or a slot, hex recess or other tool interface to allow the screw 80 to be easily turned.

A distal end 90 of the screw 80 engages with a coupling 95 that is provided between the screw 80 and the transducer array 25. The coupling 95 accommodates the rotational motion of the screw 80 without passing on rotational motion to the transducer array 25. Examples of suitable couplings 95 include a socket joint, bearing mechanism or the like.

The coupling 95 is also provided with a conformable buffer 100 that sits between the rest of the coupling 95 and the ultrasonic transducer 25. The buffer 100 is resiliently deformable. The conformable buffer 100 can assist the flexible ultrasonic transducer array 25 in conforming to a curved surface of the test object whilst evenly distributing force over the transducer array 25, thereby mitigating against damage to the transducer array 25. The conformable buffer 100 also provides a degree of compensation for expansion/contraction of the test object with heating. However, the conformable buffer 100 is preferably configured to withstand the elevated temperatures, which may limit material selection, ruling out conventional engineering polymers and elastomers. As such, high temperature materials such as graphite, fibre reinforced materials or certain minerals such as vermiculite may be used for the buffer 100 to provide the desired temperature and accommodating properties.

In this way, in use, the screw 80 of the urging mechanism 75 may be operated in order to apply and vary an axial force of the transducer array 25 acting to urge the active surface 70 of the transducer array 25 onto the corresponding surface of the test object 10. The urging mechanism 75 is therefore operable to achieve the desired acoustic coupling between the transducer array 25 and the test object 10, preferably without the use of a couplant such as gel that may be disadvantageous or unsuitable for high temperature or long term use.

Another example of an ultrasonic device 205 is shown in FIGS. 11 to 15. Features of the device 205 that correspond to features on the device 5 shown in FIGS. 1 to 8 are given like reference numbers but incremented by 200.

Figure 13:
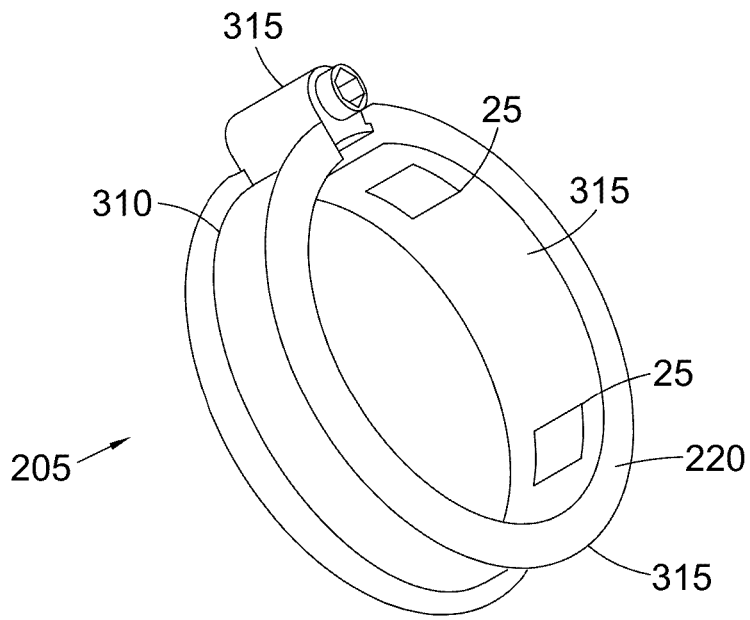
FIG. 13 is a perspective view of the ultrasonic device shown in FIG. 11.

The device 205 comprises a clamp 220 and one or more ultrasonic transducers (in this example a plurality of the ultrasonic transducers are provided in a plurality of ultrasonic transducer arrays 225, which can be seen particularly in FIGS. 9, 10 and 13) located in the clamp 220. The ultrasonic transducer arrays 225 can be those shown and described in relation to FIGS. 9 and 10, for example, or as described in any of GB1803444.7, GB 1803257.3, GB2555835, WO2018/087560, PCT/GB2019/050567 and/or PCT/GB2019/050549, all in the name of the present applicants and the contents of each of which are incorporated by reference as if disclosed in full herein.

Figure 1:
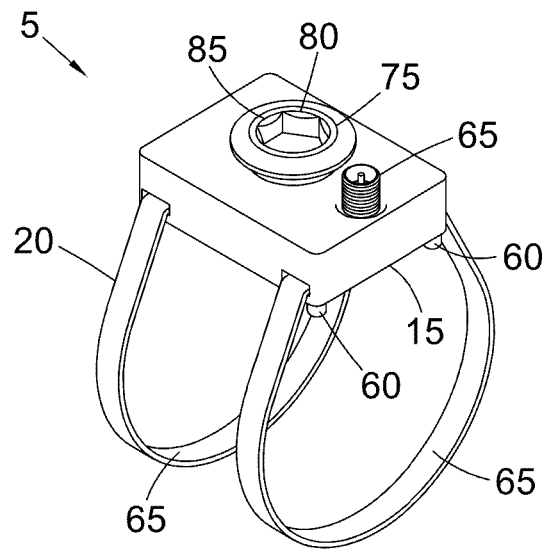
FIG. 1 is a perspective view of an ultrasonic device.
Figure 2:
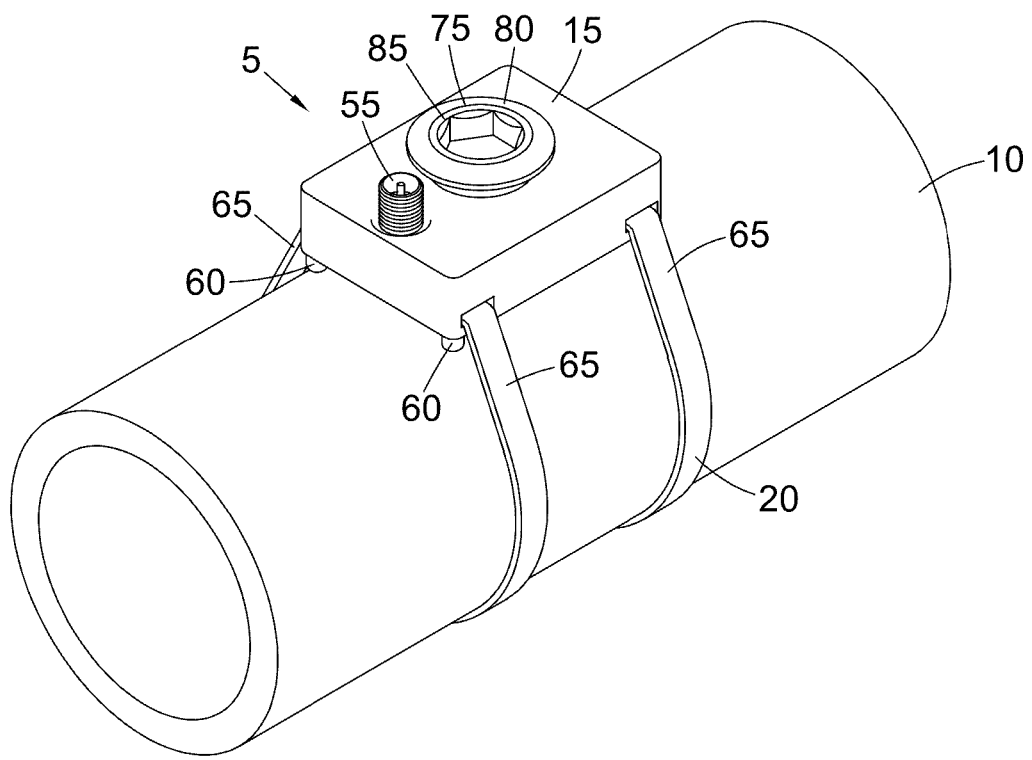
FIG. 2 is a perspective view of the ultrasonic device of FIG. 1, in use, mounted on a test object in the form of a pipe.
Figure 3:
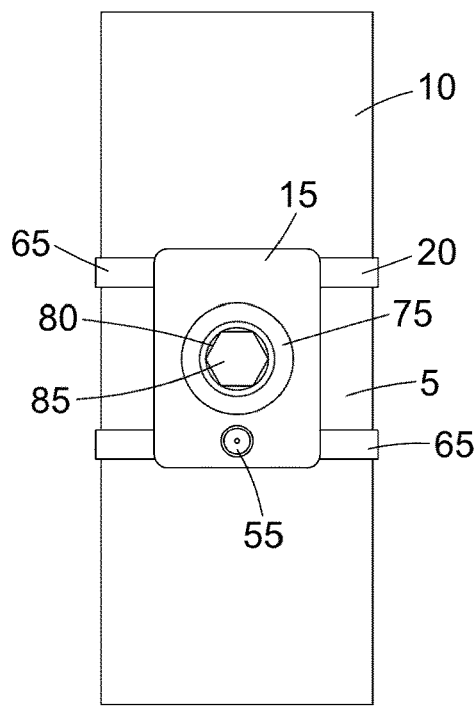
FIG. 3 is a plan view of the ultrasonic device of FIG. 1, in use, mounted on a test object in the form of a pipe.
Figure 4:
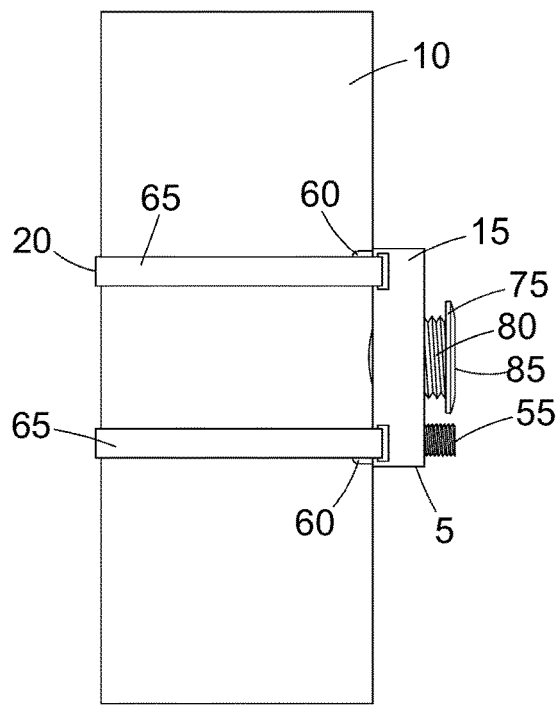
FIG. 4 is a side elevation view of the ultrasonic device of FIG. 1, in use, mounted on a test object in the form of a pipe.
Figure 5:
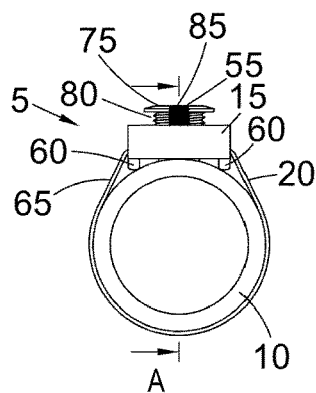
FIG. 5 is an end elevation view of the ultrasonic device of FIG. 1, in use, mounted on a test object in the form of a pipe.

Like the clamp 20 in the device 5 of FIG. 1, the clamp 220 of FIGS. 11 to 15 comprises a band 265. However, a portion of the band 265 in the device 205 is formed from a conformable material such as an elastomer, preferably an elastomer capable of withstanding high temperatures, such as up to 200° C., 250° C. or even 300° C. Suitable elastomers could include, but are not limited to: fluoroelastomers; perfluoroelastomer; high temperature silicone blends and graphite based blends. The conformable nature of the device 205 allows it to operate without a couplant, such as a gel, thereby making it beneficial for high temperature and/or long term applications.

Specifically, the band 265 comprises a conformable material sub-band 305 formed from the conformable material and provided around a securing band 310. The band 265 can be used to fasten the device 205 around the test object 10 and provide sufficient force for couplant free operation. The band 265 can be secured and tightened with a closure mechanism 315. For example, the closure mechanism could comprise a ratchet mechanism, screw/bolt closure or worm gear arrangement, and/or the like. The securing band 310 is preferably formed from a suitably durable material such as metal, e.g. stainless steel.

The conformable material (e.g. the flexible elastomer) forming the conformable sub band 305 holds the ultrasonic transducers or transducer arrays 225. The ultrasonic transducers or transducer arrays 225 can optionally be moulded into the conformable material or may be removable inserts. The conformable material is electrically insulating and a layer of the conformable material extends between the metal securing band 310 and the ultrasonic transducers or transducer arrays 225 and/or any electronics required to operate them. This arrangement may protect the ultrasonic transducers or transducer arrays 225 by distributing force evenly. This backing of conformable material also provides a degree of compensation for expansion/contraction of the test object with heating. The ultrasonic transducers or transducer arrays 225 could optionally have integrated wiring that could be moulded through the conformable material or channeled between the conformable sub-band 305 and the metal securing band 310. Alternatively, the ultrasonic transducers or transducer arrays 225 could be fitted with a surface mount connector such as a microcoax allowing them to be hooked up with a separate wire for improved modularity.

Figure 14:
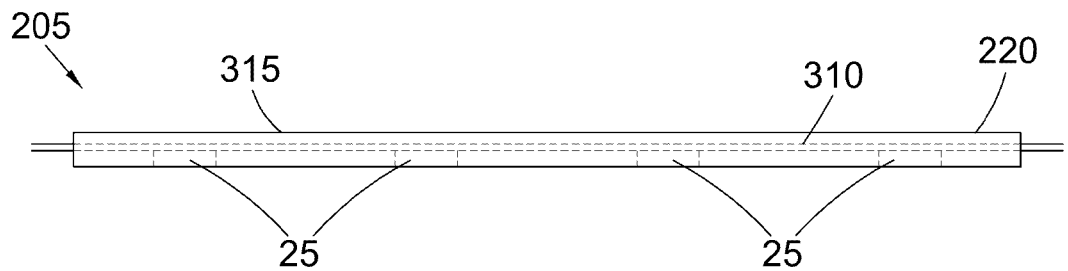
FIG. 14 is a side view of the ultrasonic device shown in FIG. 11 in a flat configuration.
Figure 15:
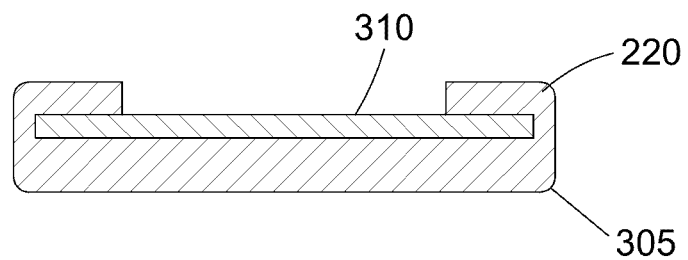
FIG. 15 is a cross sectional view through a band of the ultrasonic device shown in FIG. 11.

As shown particularly in FIG. 14, the device 205 could be produced in differing lengths for varying pipe diameters or as a long reel to be cut to length for improved customisation. Lengths of the device 205 could be produced with different spacings of ultrasonic transducers or transducer arrays 225 to allow for an optimal number of ultrasonic transducers or transducer arrays 225 and placement on a given diameter of test object 10. Combining a reel system that can be cut to length, insertable ultrasonic transducers or transducer arrays 225 with the inherent mass manufacturable nature of the above arrangement could make the device 205 well suited to continuous monitoring on large infrastructure. In addition, the design of the device 205 may allow it to be made with a very low profile, if required. This would allow the device 205 to be deployed in tight confines such as close networks of piping and close to joints and corners. The low profile also makes the device 205 well suited to fitting under insulation in oil and gas pipeline applications with minimal disruption to the insulation design.

Figure 16:
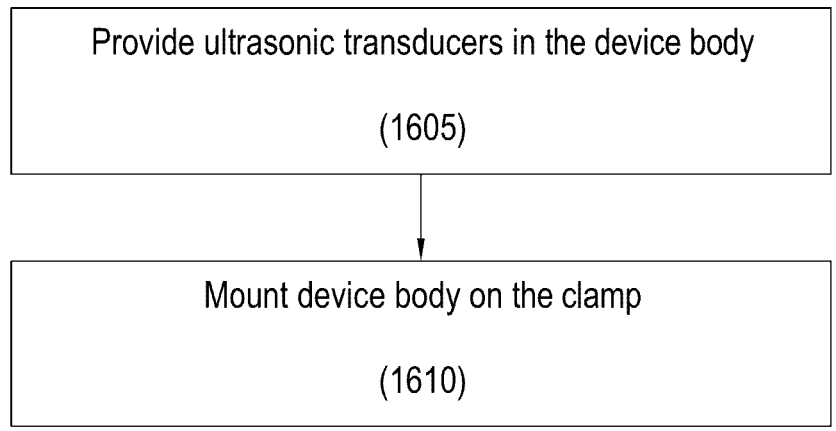
FIG. 16 is a flowchart of a method of assembling an ultrasonic transducer.

FIG. 16 illustrates a method of assembling or repairing the devices 5, 205, in which the one or more ultrasonic transducers 25, 225 are provided in the device body 15 and/or the conformable sub-band 305 (step 1605) and mounted on the clamp 20 or securing band 310 (step 1610).

Figure 17:
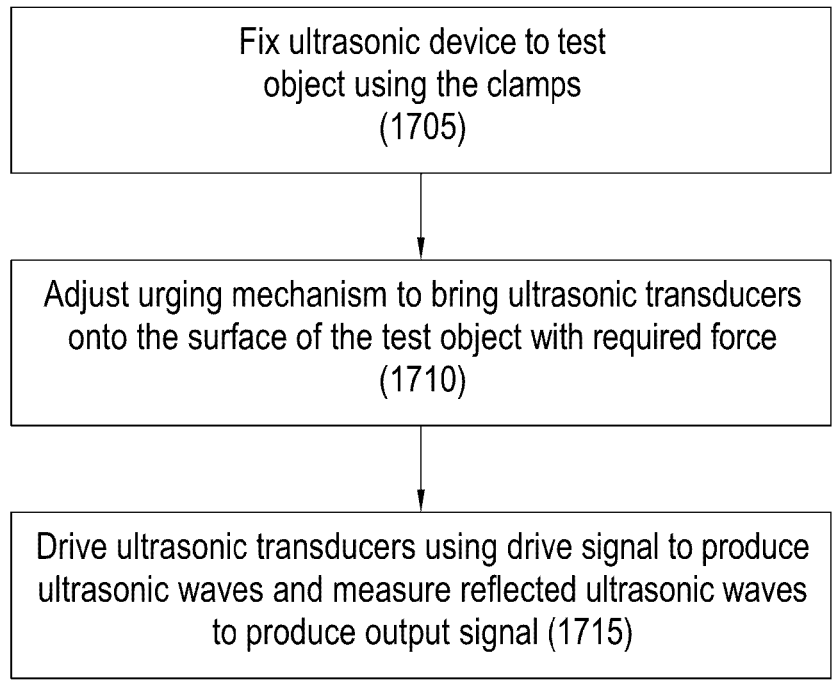
FIG. 17 is a flowchart of a method of using an ultrasonic transducer.

FIG. 17 illustrates a method of using the devices 5, 205 in which the ultrasonic device 5, 205 is fixed to the test object 10 using the clamps 20 (step 1705). Thereafter, the urging mechanism is adjusted to force the transducers array 25 onto the test object 10 (step 1710). This may involve rotating the screw 80 or by stretching the conformable sub bands 305. Thereafter, the transducers 25 are driven using a drive signal to produce ultrasonic waves and are interrogated by a control device to receive output signals resulting from reflected ultrasonic waves being received by the transducers 25 (step 1715).

Although specific examples are described above in relation to the Figures, it will be appreciated that variations on the above examples are possible. As such, the scope of protection is defined by the claims and not by the above specific examples.

For example, although examples of piezoelectric materials being ZnO or AlN are given above, it will be appreciated that other piezoelectric materials could be used instead. Furthermore, although transition metal doped piezoelectric materials are described, it will be appreciated that non-doped piezoelectric materials could be used. In addition, although various thicknesses, dimensions, numbers and geometric arrangements of electrodes, conductive tracks and contacts are given above, it will be appreciated that other thicknesses, dimensions, numbers and geometric arrangements of electrodes, conductive tracks and contacts could be used. Indeed, although the electrodes are all shown as the same size and shape, it will be appreciated that at least some or all of the electrodes may be of different sizes and/or shapes.

Furthermore, whilst clamps in the form of bands are used, it will be appreciated that other clamping mechanisms such as gripping members, interference or press fit mechanisms and/or the like could be used. In addition, whilst various examples of suitable conformable materials have been given, it will be appreciated that other suitable conformable materials could be used.

The invention claimed is:

1. An ultrasonic device, the device comprising:
   at least one flexible ultrasonic transducer; and
   a clamp configured to mount the at least one flexible ultrasonic transducer to a test object;
   an urging mechanism coupled to the at least one flexible ultrasonic transducer via a coupling, the urging mechanism being configured to urge the at least one transducer towards and/or onto the test object, in use;
   a device body, wherein the at least one flexible transducer and the urging mechanism are housed in or mounted on the device body; and
   a conformable buffer between the urging mechanism and the at least one flexible ultrasonic transducer, the conformable buffer comprising at least one of graphite, fibre reinforced material and/or a mineral configured to withstand temperatures of 150° C. or higher;
   wherein the at least one flexible transducer comprises a layer of polycrystalline, inorganic piezoelectric material deposited directly on a metallic foil substrate; the metallic foil substrate is operable as a counter electrode; and the layer of piezoelectric material is thinner than the metallic foil substrate; and
   wherein the clamp comprises one or more bands, and at least part of the one or more bands is formed of a conformable elastomeric material that is stable at temperatures of 150° C. and higher or −10° C. or lower, such that the one or more bands comprise a conformable band or band portion.

2. The device according to claim 1, wherein the urging mechanism is configured such that position of, or the force applied by the urging mechanism on, the at least one flexible ultrasonic transducer is selectively variable or adjustable by operation of the urging mechanism.

3. The device according to claim 1, wherein the urging mechanism comprises a screw or a rotational assembly.

4. The device according to claim 3, wherein the screw or the rotational assembly is coupled to the at least one flexible ultrasonic transducer via the coupling, the coupling being configured to accommodate the rotational motion of the screw without transferring rotational motion to the at least one flexible ultrasonic transducer.

5. The device according to claim 1, wherein the conformable buffer is configured to withstand temperatures of 250° C., 300° C., or higher.

6. The device of claim 1, wherein the ultrasonic device is configured to operate at temperatures between 100° C. and 500° C.

7. The device of claim 1, further comprising one or more temperature sensors integrated into the ultrasonic device.

8. The device of claim 1, wherein the at least one flexible ultrasonic transducer is arranged in a transducer array.

9. The device of claim 1, in which the at least one flexible transducer comprises one or more discrete electrodes provided directly on the layer of polycrystalline, inorganic piezoelectric material.

10. The device of claim 1, in which the layer of piezoelectric material has a thickness in the range of 2 μm to 20 μm.

11. A method of manufacturing, repairing or assembling the ultrasonic device of claim 1, the method comprising:
   providing the at least one flexible ultrasonic transducer and the clamp;
   coupling the urging mechanism to the at least one flexible ultrasonic transducer, wherein the conformable buffer is positioned between the at least one flexible ultrasonic transducer and the urging mechanism;
   housing the at least one flexible transducer and the urging mechanism in, or mounting the at least one flexible transducer and the urging mechanism on, the device body; and
   mounting the device body to the clamp.

12. A method comprising:
   mounting the ultrasonic device of claim 1 to a test object using the clamp;
   bringing the at least one transducer into contact and/or onto a surface of the test object; and
   providing a test signal to the at least one transducer and/or receiving an output signal from the at least one transducer,
   wherein at least part of the at least one flexible ultrasonic transducer is provided on or in the device body.

13. The device according to claim 1, wherein the urging mechanism is configured to move and apply a force on the at least one flexible ultrasonic transducer.

14. The device according to claim 1, wherein the coupling comprises a socket joint and/or the coupling is formed of or comprises a rigid material.

* * * * *